United States Patent [19]

Tetenbaum et al.

[11] Patent Number: 4,499,233

[45] Date of Patent: Feb. 12, 1985

[54] WATER DISPERSIBLE, MODIFIED POLYURETHANE AND A THICKENED AQUEOUS COMPOSITION CONTAINING IT

[75] Inventors: Marvin T. Tetenbaum, Wexford, Pa.; Burlon C. Crowley, Toms River, N.J.

[73] Assignee: NL Industries, Inc., New York, N.Y.

[21] Appl. No.: 491,039

[22] Filed: May 3, 1983

[51] Int. Cl.$^3$ ............... C08G 18/50; C08G 18/32; C08G 18/34

[52] U.S. Cl. ................ 524/591; 528/69; 528/904

[58] Field of Search ............... 528/69, 904; 524/591

[56] References Cited

U.S. PATENT DOCUMENTS

| | | | |
|---|---|---|---|
| 3,377,308 | 4/1968 | Oertel et al. | 524/708 |
| 3,442,843 | 5/1969 | Keberle et al. | 524/591 |
| 3,923,926 | 11/1975 | Harada et al. | 528/48 |
| 3,997,491 | 12/1976 | Matsuda et al. | 524/591 |
| 4,008,196 | 2/1977 | Matsuda et al. | 528/69 |
| 4,016,120 | 4/1977 | Matsuda et al. | 524/591 |
| 4,016,121 | 4/1977 | Matsuda et al. | 524/591 |
| 4,079,028 | 3/1978 | Emmons et al. | 528/68 |
| 4,155,892 | 5/1979 | Emmons et al. | 524/591 |
| 4,180,491 | 12/1979 | Kim et al. | 524/317 |
| 4,293,679 | 10/1981 | Cogliano | 528/48 |
| 4,298,511 | 11/1981 | Schimmel et al. | 524/507 |
| 4,314,924 | 2/1982 | Haubennestel et al. | 524/779 |
| 4,327,008 | 4/1982 | Schimmel et al. | 528/69 |
| 4,373,083 | 2/1983 | Seiner | 528/69 |
| 4,408,008 | 10/1983 | Markusch | 528/69 |
| 4,426,485 | 1/1984 | Hoy et al. | 528/69 |

OTHER PUBLICATIONS

Saunders et al., Polyurethanes Part II, Interscience (N.Y.), 1964, pp. 300–302.

Primary Examiner—Herbert S. Cockeram
Attorney, Agent, or Firm—Burns, Doane, Swecker & Mathis

[57] ABSTRACT

A water dispersible, modified polyurethane which is the reaction product of polyisocyanate, polyether polyol, modifying agent containing at least two active hydrogen moieties and capping agent. The modified polyurethane is preferably prepared by reacting the polyisocyanate, the polyether polyol and the modifying agent and then adding the capping agent. The modified polyurethane resists microbial attack, exhibits superior efficiency in thickening aqueous compositions and imparts improved leveling.

Included among the modifying agents are ethylene diamine, 1,6-diaminohexane, 1,10-diaminodecane, N-phenyl-p-phenylenediamine, succinic acid, suberic acid, sebacic acid, 1,10-decanedicarboxylic acid, 1,4-benzenedicarboxylic acid, ethanolamine, 2-(ethylamino)ethanol, and p-carboxyphenol and mixtures thereof.

30 Claims, No Drawings

WATER DISPERSIBLE, MODIFIED POLYURETHANE AND A THICKENED AQUEOUS COMPOSITION CONTAINING IT

BACKGROUND OF THE INVENTION

1. Field of the Invention

The present invention relates to a water dispersible, modified polyurethane, a thickened aqueous composition containing the modified polyurethane and a method of increasing the viscosity and improving the leveling characteristics of an aqueous composition by incorporating the modified polyurethane. The present invention also relates to a method of preparing the modified polyurethane.

2. Description of the Prior Art

It has long been known in the art to use various materials to thicken an aqueous system. Depending on the composition of the aqueous system, the gels produced with these thickeners are useful as decorative and protective coatings, paper coatings, cosmetics and personal care items, adhesives and sealants, inks, petroleum drilling fluids, packer fluids, and the like.

The thickener serves several roles in aqueous systems. In latex decorative coatings, for instance, the thickener may provide improved stability and pigment suspension, and improved application properties. In cosmetics and personal care items, the thickener will improve body, smoothness and silkiness, thereby making the product more aesthetically pleasing. In petroleum drilling fluids, the thickener improves the suspension of the cuttings, thereby increasing the efficiency with which they can be removed.

Many thickeners, both natural and synthetic, are known in the art. However, all suffer from some disadvantage that limits their usage. Natural thickeners, for instance, include casein, alginates, gum tragacanth, and modified cellulose, including methyl cellulose, hydroxyethyl cellulose, hydroxypropyl cellulose, and carbomethoxy cellulose. These natural products vary in their thickening efficiency, and provide poor flow and leveling properties. Further, they are subject to microbial attack which requires the additional presence of antimicrobial agents.

Synthetic thickeners include various acrylic polymers and maleic anhydride copolymers. Some of these are found to be pH dependent, others are hydrolytically unstable, and others are sensitive to various components normally found in aqueous coatings.

One type of synthetic thickener is a low molecular weight polyurethane characterized by at least three hydrophobic groups interconnected by hydrophilic polyether groups as disclosed in U.S. Pat. Nos. 4,079,028 and 4,155,892. The polyurethane is prepared by reacting at least one water soluble polyether polyol with at least one monofunctional hydrophobic organic compound selected from monofunctional active hydrogen compounds and organic monoisocyanates. There may also be present in the reaction mixture at least one water insoluble organic polyisocyanate or at least one polyhydric alcohol or polyhydric alcohol ether. The use of a related polyurethane in combination with a surfactant cothickener and a non-aqueous, inert organic diluent to thicken print paste is set forth in U.S. Pat. No. 4,180,491.

Another type of urethane rheology modifier which is useful in water and organic solvent based compositions is disclosed in U.S. Pat. No. 4,298,511. The rheology modifier is the reaction product of a polyalkylene oxide, a polyfunctional material having at least 3 active hydrogens or at least 3 isocyanate groups, a diisocyanate and water. The reactants are selected such that there are no terminal hydrophobic groups in the rheology modifier.

A urethane thixotropic agent for coating compositions is set forth in U.S. Pat. No. 4,314,924. The thixotropic agent is prepared by reacting a mono-hydroxy compound with a diisocyanate to form a mono-isocyanate adduct. The adduct is then converted into a urea-urethane by reaction with a polyamine in an aprotic solvent in the presence of lithium chloride.

In U.S. Pat. No. 3,923,926, a thixotropic polyurethane is prepared by reacting a polyurethane prepolymer having at least two terminal free isocyanate groups and a block polyether compound formed from ethylene oxide and propylene oxide and having at least two terminal secondary alcohol groups. To enhance the thixotropic property, finely divided silica or bentonite may be added.

In order to render the polyurethane insoluble in water and other types of solvents, diamines, dicarboxylic acids and other materials have been used as cross-linking agents. Illustrative of the art disclosing the use of cross-linking agents are J. M. Buist and H. Gudgeon's "Advance in Polyurethane Technology", pages 49 ff, the "Encyclopedia of Polymer Science and Technology", Volume II, pp. 55 ff and 527 and Bernard A. Dunbrow's "Polyurethanes, Second Edition", p. 28.

A further example of a cross-linked polyurethane is disclosed in U.S. Pat. No. 4,293,679. In that patent, solid, discrete, hydrophilic, cross-linked polyurethane particles are formed from a composition which comprises: (a) a water reactant; (b) a defined isocyanate capped prepolymer; (c) a water soluble solvent for (b); and (d) when the reaction functionality of (b) is two, a cross-linking agent containing at least three functional groups.

A different type of cross-linked polyester-urethane is described in U.S. Pat. No. 3,804,810. The polymer is prepared by reacting (a) a defined linear polyester, (b) at least one organic diisocyanate, and (c) at least one cross-linking agent having a functionality greater than 2. The cross-linked polyester-urethane is stated as being useful as adhesives, coating compositions, primers, and for binding magnetic and/or conductive particles to a suitable support.

Despite the activity in the art, there has not been produced a water dispersible, modified polyurethane which is useful for increasing the viscosity and improving the leveling characteristics of an aqueous composition in an efficient manner.

OBJECTS AND SUMMARY OF THE INVENTION

Accordingly, it is a general object of the present invention to solve or substantially alleviate the noted problems in the art.

It is a more specific object of the present invention to provide a water dispersible, modified polyurethane which is useful for increasing the viscosity of an aqueous composition in an efficient manner.

It is another object of the present invention to provide a water dispersible, modified polyurethane which improves the flow and leveling characteristics of an aqueous composition.

It is another object of the present invention to provide a water dispersible, modified polyurethane and aqueous compositions containing the same which resist microbial attack.

It is a further object of the present invention to provide a thickened aqueous composition which comprises water and a water dispersible, modified polyurethane.

It is a still further object of the present invention to provide a method of thickening aqueous compositions.

It is a yet further object of the present invention to provide a method of preparing a water dispersible, modified polyurethane.

In one aspect, the present invention provides a water dispersible, modified polyurethane. The polymer is the reaction product of:

(a) polyisocyanate;
(b) polyether polyol in an amount ranging from about 0.10 to about 10.00 moles per mole of polyisocyanate;
(c) modifying agent in an amount ranging from about 0.015 to about 3.400 moles per mole of polyisocyanate, said modifying agent having the formula $$X_x-R-Y_y$$

wherein R represents a group containing from 0 to 10 carbon atoms, X is a group containing at least one active hydrogen moiety selected from the group consisting of primary amino, secondary amino, carboxyl and mixtures thereof, Y is a group containing at least one active hydrogen moiety selected from the group consisting of primary amino, secondary amino, carboxyl, hydroxyl, mercapto and mixtures thereof, the sum $(x+y)$ is an integer greater than 1 and x is at least 1 wherein the polyisocyanate, the polyether polyol and the modifying agent are used to form the polymer chain; and (d) capping agent which is reactive with the reaction product of the polyisocyanate, the polyether polyol and the modifying agent and which is present in an amount sufficient to cap the reaction product of the polyisocyanate, the polyether polyol and the modifying agent.

In other aspects, the present invention provides a thickened aqueous composition and a method of increasing the viscosity and leveling characteristics of an aqueous composition by emoloying a defined, water dispersible, modified polyurethane.

In another aspect, the present invention provides a method of preparing a water dispersible, modified polyurethane. The method comprises:

(a) reacting at a temperature in the range of from about 20° to about 150° C. for from about 0.1 to about 48 hours,
  (i) polyisocyanate,
  (ii) polyether polyol in an amount ranging from about 0.10 to about 10.00 moles per mole of polyisocyanate,
  (iii) modifying agent in an amount ranging from about 0.015 to about 3.400 moles per mole of polyisocyanate, said modifying agent having the formula $$X_x-R-Y_y$$

wherein R represents a group containing from 0 to 10 carbon atoms, X is a group containing at least one active hydrogen moiety selected from the group consisting of primary amino, secondary amino, carboxyl and mixtures thereof, Y is a group containing at least one active hydrogen moiety selected from the group consisting of primary amino, secondary amino, carboxyl, hydroxyl, mercapto and mixtures thereof, the sum of $(x+y)$ is an integer greater than 1 and x is at least 1 wherein the polyisocyanate, the polyether polyol and the modifying agent are used to form the polymer chain;

(b) reacting with the reaction product of step a), at a temperature in the range of from about 20° to about 150° C. for from about 0.5 to about 48 hours, capping agent in an amount sufficient to cap the reaction product of step (a) to thereby form the water dispersible, modified polyurethane; and (c) recovering the water dispersible, modified polyurethane.

Further advantages and features of the invention as well as the scope, nature and utilization of the invention, will become apparent to those skilled in the art from the following description of the preferred embodiments of the invention.

DESCRIPTION OF THE PREFERRED EMBODIMENTS

As stated hereinabove, the present invention relates to a water dispersible, modified polyurethane. The modified polyurethane is prepared by reacting a polyisocyanate, a polyether polyol and a modifying agent to yield an intermediate which is then capped with a capping agent.

The polyisocyanate contains at least two isocyanate groups per molecule and may be linear or branched aliphatic, cycloaliphatic or aromatic. The polyisocyanate may also be in the form of a prepolymer having two or more unreacted isocyanate moieties and having an average molecular weight in the range of from about 500 to about 10,000. The preparation of such a prepolymer is well known in the art as demonstrated in aforementioned U.S. Pat. No. 3,923,926, the contents of which are incorporated by reference.

The polyisocyanate preferably contains two isocyanate moieties per molecule. Higher functionality polyisocyanates may be used as a portion of the total isocyanate requirement. However, the use of higher functionality polyisocyanates is limited by the possibility of the formation of a cross-linked, insoluble gel which is unsuitable for purposes of the present invention. Tri and higher functional polyisocyanates, if used, generally constitute less than about 20 mole % of the total isocyanate minimum requirement. Preferably, tri and higher functional polyisocyanate constitute less than about 10 mole % and, most preferably, they are absent from the polyisocyanate.

Exemplary polyisocyanates useful in the preparation of the modified polyurethane of the present invention are 1,4-tetramethylene diisocyanate, 1,6-hexamethylene diisocyanate, 2,2,4-trimethyl-1,6-diisocyanatohexane, 1,10-decamethylene diisocyanate, 1,4-cyclohexylene diisocyanate, 4,4'-methylenebis(isocyanatocyclohexane), 1-isocyanato-3-isocyanatomethyl-3,5,5-trimethylcyclohexane, m- and p-phenylene diisocyanate, 2,6- and 2,4-tolylene diisocyanate, xylene diisocyanate, 4-chloro-1,3-phenylene diisocyanate, 4,4'-biphenylene diisocyanate, 4,4-methylene diphenylisocyanate, 1,5-naphthylene diisocyanate, 1,5-tetrahydronaphthylene diisocyanate, polymethylene polyphenylisocyanates sold under the brand name "PAPI," such as "PAPI 135" (equivalent weight of 133.5 and average isocyanate functionality of 2.7) and "PAPI 901" (equivalent weight of 133 and average isocyanate functionality of 2.3), aromatic triisocyanate adduct of trimethylol propane and tolylene diisocyanate sold under the brand name "Mondur CB-75", aliphatic triisocyanate product of the hydrolytic trimerization of 1,6-hexamethylene diisocyanate, sold under the brand name "Desmodur N", C$_{36}$ dimer acid diisocyanate sold under the brand name "DDI", based on dimer acids as discussed in J. Am. Oil Chem. Soc. 51,522 (1974) and mixtures thereof.

The preferred polyisocyanates are 1,6-hexamethylene diisocyanate, 1-isocyanato-3-isocyanatomethyl-3,5,5-trimethyl cyclohexane, the 2,6- and 2,4-tolylene diisocyanates and mixtures thereof. Most preferred are the two tolylene diisocyanate isomers or mixtures thereof.

It is to be understood that the polyisocyanate molecule may contain functional moieties other than isocyanate if these additional moieties are substantially unreactive with either the isocyanate or the active hydrogen groups under the reaction conditions for the preparation of the modified polyurethane thickener of this invention. Consistent with this understanding, the term "polyisocyanate" and the named polyisocyanates encompass such materials unless otherwise indicated. Exemplary moieties which do not adversely affect the reaction include ketones, esters, and aldehydes, amides, particularly N,N-disubstituted amides, halogenated hydrocarbons, ethers and tertiary amines.

The polyether polyol used in the present invention is present in an amount ranging from about 0.10 to about 10.00, preferably from about 0.50 to about 5.00 and most preferably from about 0.85 to about 1.45 moles per mole of polyisocyanate. The polyether polyol is water soluble and may be a homopolymer or a block or random copolymer having the repeating unit:

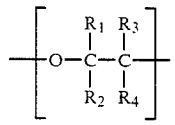

wherein R$_1$, R$_2$, R$_3$ and R$_4$ are independently selected from the group consisting of H, CH$_3$ and C$_2$H$_5$.

The polyether polyol must have a hydroxyl moiety substantially at each termini of the polyether chain and/or have one end of the polyether chain linked to a central molecule having at least one additional active hydrogen moiety and/or polyether chain attached thereto. This definition therefore includes low molecular weight polyurethane prepolymers having at least two hydroxyl moieties. In this regard, the polyether polyol may also be a three dimensional polyether polyol formed by the combination of at least one of the aforementioned homopolymer, block or random copolymers with a material having three or more moieties onto which the polyether chain may be formed or reacted. Such moieties include amine, carboxylic acid, and hydroxyl functions, and mixtures thereof. Representative examples of these tri- and higher functional materials include ethanolamine, glycerol, trimethylol propane, pentaerythritol, sorbitol, malic acid, tartaric acid, and citric acid. However, since the use of a three dimensional polyether polyol may lead to the formation of an insoluble, cross-linked gel which is unsuitable for the present invention, the amount of three dimensional forming material is maintained less than about 50 equivalent %, preferably less than about 20 equivalent %, and most preferably is negligible.

The average molecular weight of the polyether polyol is from about 4,000 to about 20,000, preferably from about 4,000 to about 14,000 and most preferably from about 6,000 to about 10,000. Polyether polyols having average molecular weights above about 20,000 form water insoluble polyurethane thickeners. Polyether polyols having average molecular weights of less than about 4000, while usable, produce inefficient thickeners with respect to those of the stated average molecular weight ranges.

Exemplary preferred polyether polyols useful for the present invention are polyethylene glycol, random and block copolymers of a group of diols consisting of ethylene glycol, propylene glycol, and butylene glycol, and polyether polyol adducts of glycerol, trimethylol propane, and pentaerythritol and mixtures thereof. The most preferred polyether polyol is polyethylene glycol.

The modifying agent is incorporated into the polymer chain and creates linkages which are believed to be superior in hydrogen bonding when compared to the urethane linkages. The improved hydrogen bonding permits the modified polyurethane to thicken aqueous compositions in a highly efficient manner. More specifically, by incorporating the modifying agent into the polyurethane, the viscosity of an aqueous composition containing 4% by weight of the modified polyurethane of the present invention at 25° C. as measured with a Brookfield LVT Rotational Viscometer using a No. 4 Spindle at 12 rpm is from about 12,000 to about 40,000 cP, preferably from about 20,000 to about 30,000 cP.

The modifying agent is present in the modified polyurethane in an amount ranging from about 0.015 to about 3.400, preferably from about 0.025 to about 1.000 and most preferably from about 0.050 to about 0.300 moles per mole of polyisocyanate. The modifying agent has the general formula:

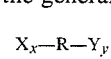

wherein R represents a group containing from 0 to 10 carbon atoms, X is a group containing at least one active hydrogen moiety selected from the group consisting of primary amino, secondary amino, carboxyl and mixtures thereof, Y is a group containing at least one active hydrogen moiety selected from the group consisting primary amine, secondary amino, carboxyl, hydroxyl, mercapto and mixtures thereof, the sum of (x+y) is an integer greater than 1 and x is at least 1. In the event that x is 2 or more, y may either be 0 or a larger number.

The group designated by R may be linear or branched aliphatic, cycloaliphatic or aromatic and the X and Y groups may occur at any position on the group. Preferably, the group contains 2 to 8 carbon atoms and most preferably the group contains 2 to 6 carbon atoms with an active hydrogen moiety located on the terminal carbon atoms. Other moieties which are not active hydrogen moieties may also be located on the group and include ketones, aldehydes, esters, amides, particularly N,N-disubstituted amides, halogens, tertiary amines and the like.

Especially preferred embodiments of the invention are when X and Y are chosen from the group consisting of primary amino, secondary amino, carboxyl moieties and mixtures thereof and a particularly preferred embodiment of the invention is when X and Y are primary amino.

Suitable examples of the polyurethane modifying agent include: hydrazine, α,ω-amino alkanes, such as 1,2-ethylenediamine, 1,3-diaminopropane, 1,4-diaminobutane, 1,5-diaminopentane, 1,6-diaminohexane (hexamethylenediamine), 1,7-diaminoheptane, 1,8-diaminooctane, 1,9-diaminononane, 1,10-diaminodecane, 1,12-diaminododecane and higher chain length diamines to the extent that they are capable of forming a modified polyurethane within the scope of this invention; cycloaliphatic amines, such as 1,4-diaminocyclohexane and isophonone diamine; aromatic amines, such as 1,4-diaminobenzene, 1,4-diaminonaphthalene, 1,8-diaminonaphthalene, N-phenyl-p-phenylenediamine and the like; polyamino compounds, such as diethylene triamine, triethylenetetramine, tetraethylene pentamine; substituted diamines, such as are prepared by Michael addition of acrylonitrile followed by reduction of the nitrile to a primary amino group, such as 3-cocoamino-1-propylamine, 3-tallowamino-1-propylamine, 3-(hydrogenated tallow)amino-1-propylamine, and N-alkyl-N,N bis(3-aminopropyl) amine, wherein the alkyl group contains one to 22 carbon atoms.

The polyurethane modifying agent may likewise be a dicarboxylic acid, such as oxalic acid, malonic acid, succinic acid, glutaric acid, adipic acid, pimelic acid, suberic acid, azelaic acid, sebacic acid, maleic acid, fumaric acid 1,10-decanedicarboxylic acid and the like, 1,2-, 1,3- and 1,4-benzenedicarboxylic acids, 1,4-cyclohexanedicarboxylic acid, 1,3-cyclopentanedicarboxylic acid, 1,3-cyclohexanedicarboxylic acid, etc.

The polyurethane modifying agent may also be an amino acid such as naturally occurring α-amino acids and α-amino-ω-carboxylic acids. Examples include 2-aminoacetic acid, 2-aminopropanoic acid, 3-aminopropanoic acid, 2-aminobutyric acid, 4-aminobutyric acid, 6-aminohexanoic acid, 10-aminodecanoic acid, and aryl amino acids such as p-aminobenzoic acid.

Likewise, the polyurethane modifying agent may be hydroxylamine or an alkanol amine, such as ethanolamine, diethanolamine, 2-(ethylamino) ethanol, propanolamine, dipropanolamine and 6-aminohexanol.

Alternatively, the polyurethane modifying agent may be a hydroxy acid, such as 2-hydroxyacetic acid, 3-hydroxypropanoic acid, 4-hydroxybutanoic acid, 5-hydroxypentanoic acid, 6-hydroxyhexanoic acid, and 10-hydroxydecanoic acid. Also included in this class of polyurethane modifying agents are phenol carboxylic acids, such as salicylic acid, resorcylic acid, p-carboxyphenol and the like.

The polyurethane modifying agent may further be a mercaptoamine, such as 2-mercapto-1-aminoethane, 3-mercaptoaminopropane, 6-mercapto-1-aminohexane and the like. Also useful in the preparation of the polyurethane thickeners of this invention are mercaptocarboxylic acids, such as mercaptoacetic acid, 3-mercaptopropanoic acid, 6-mercaptohexanoic acid, 2-mercaptobenzoic acid, 4-mercaptobenzoic acid and the like.

Of the foregoing, the preferred polyurethane modifying agents are ethylene diamine, 1,6-diaminohexane, 1,10-diaminodecane, N-phenyl-p-phenylenediamine, succinic acid, suberic acid, sebacic acid, 1,10-decanedicarboxylic acid, 1,4-benzene-dicarboxylic acid, ethanolamine, 2-(ethylamino)ethanol, and p-carboxyphenol and mixtures thereof.

Especially preferred modifying agents are α,ω-diaminoalkanes, dicarboxylic acids, aminocarboxylic acids and mixtures thereof and the most preferred modifying agent is ethylenediamine.

More than one of the modifying compounds may be used in combination in the preparation of the modified polyurethane according to this invention and the term "modifying agent" encompasses such combinations unless otherwise stated. The required amount of polyurethane modifying agent may include a portion of tri or higher functional material. However, if a tri or higher functional modifying agent is used, the amount must be limited in order to avoid gelation of the modified polyurethane into a water insoluble gel. Typically, this involves the use of less than than about 20 mole %, preferably less than about 10 mole % and most preferably a tri or higher functional modifying agent is absent from the total amount of modifying agent.

The amounts of tri or higher functional polyisocyanate, polyether polyol and modifying agent set forth in this specification should be viewed as general guidelines. Additional guidelines exist in the literature as exemplified in the section entitled "Theory of Gelation" in "Advances in Chemistry Series (No. 34) Polymerization and Polycondensation Processes", edited by R. F. Gould, 1962, and published by the American Chemical Society, the contents of which are incorporated by reference. Whatever guideline is selected, the key criterion is that the total amount of tri or higher functional reactants must be less than the amount necessary to form a cross-linked, non-dispersible water gel.

As is known in the art, the actual maximum amount of each reactant permitted so as to avoid gelation will vary depending on the chemical nature of the reactant, and its functionality, the amounts, chemical natures and functionalities of the other reactants and the degree of polymerization of the overall modified polyurethane. Thus, the present invention will encompass an embodiment in which the amount of a particular reactant may be composed of a percentage of a tri or higher functional material which is greater than the amount stated in the specification if a water soluble gel is not obtained. Conversely, the present invention will not encompass an embodiment wherein a water insoluble gel is obtained even though the amount of tri or higher functional material may be below the stated limit.

As the name indicates, the capping agent is used to cap the ends of the polymer chain upon completion of the polymerization reaction. This prevents further reaction of the chain ends which might cause the polymer to become water insoluble. Additionally, the use of the capping agent reduces the toxicity of the polymer and increases the efficiency thereof by imparting a hydrophobic nature to the ends of the polymer chain.

The capping agent is present in an amount ranging from about 0.10 to about 10.00, preferably from about 0.50 to about 5.00 and most preferably from about 0.85 to about 1.45 moles per mole of polyisocyanate. The capping agent is a linear or branched aliphatic, cycloaliphatic or aromatic, preferably substantially water-insoluble compound containing a single functional group that is capable of reacting with the end group of the uncapped polymer chain. Depending on the reaction conditions and the amounts of the polyether polyol, polyisocyanate and polyurethane modifying agent, the monofunctional capping agent may be either (1) reactive with isocyanate moieties (i.e., contains an active hydrogen) or (2) reactive with active hydrogen moieties.

The capping agent may contain other moieties in addition to that moiety that functions to terminate the polymer chain growth. However, these moieties must not be reactive with either isocyanate or active hydrogen components under the reaction conditions used in the preparation of the modified polyurethane of this invention. Such moieties includes ketones, aldehydes, esters, hydrogenated hydrocarbons, tertiary amines, ethers and amides particularly N,N-disubstituted amides.

As stated earlier, the capping agent may be reactive with either an isocyanate moiety or an active hydrogen compound, and the selection of a particular capping agent is dependent on the reaction conditions and molar quantities of the other reactants. If the reaction conditions are chosen such that the uncapped modified polyurethane is substantially isocyanateterminated, the capping agent should contain one active hydrogen moiety capable of reacting with an isocyanate moiety. Such active hydrogen moieties include hydroxyl, carboxylic acid, mercapto and primary and secondary amines. Representative examples of hydroxyl compounds that may be useful as capping agents include: octanol, decanol, dodecanol (lauryl alcohol), tetradecanol, hexadecanol, stearyl alcohol and 2-ethylhexanol; phenolics, such as phenol, cresol; alkylphenols, such as octylphenol, nonylphenol and dodecylphenol; and alkyl and aryl polyether alcohols, such as the polyethylene oxide adducts of lauryl alcohol, octylphenol and nonylphenol.

Examples of carboxylic acids that are useful as capping agents include: $C_8$ to $C_{22}$ alkyl carboxylic acids, such as octanoic acid, decanoic acid, dodecanoic acid, tetradecanoic acid, hexadecanoic acid, octadecanoic acid (stearic acid), eicosonoic acid, docosonoic acid; naturally occurring mixtures of acids, such as coco acids, tallow acids, rapeseed acids and the hydrogenated forms of these acids; aromatic acids, such as benzoic acid and naphthenoic acids; alkyl substituted aromatic acids, such as octylbenzoic acid and dodecylbenzoic acid; alicyclic acids, such as cyclopentane carboxylic acid, cyclohexanecarboxylic acid, and cyclooctanecarboxylic acid; and alkoxypropyl acids derived from the Michael addition of alcohols to acrylic acid, such as 3-octyloxypropanoic acid, 3-dodecyloxypropanoic acid and 3-octadecyloxypropanoic acid.

Mercaptans useful as capping agents include octyl mercaptan, decylmercaptan, dodecylmercaptan, tetradecylmercaptan, hexadecylmercaptan, octadecylmercaptan and the like.

Both primary and secondary amines may be used as capping agents in the preparation of the modified polyurethane of this invention. Particularly useful are those amines that contain at least one alkyl chain having from 8 to 22 carbon atoms or an aromatic amine. If the amine is a secondary amine (i.e., has two organic radicals attached to a nitrogen), the two radicals may be the same or different. Suitable examples of primary amines useful in this invention are: octylamine, decylamine, dodecylamine, tetradecylamine, hexadecylamine, octadecylamine, eicosylamine and decosylamine, natural mixtures, such as cocoamine, tallow amine, soya amine, behenylamines; alkoxypropylamines, such as 3-octyloxypropylamine, 3-dodecyloxypropylamine, 3-stearyloxypropyl amine; aromatic amines, such as benzylamine, 1-naphthylamine and 2-naphthylamine. Examples of secondary amines include dioctylamine, didecylamine, didodecylamine, ditetradecylamine, dihexadecylamine, dioctadecylamine, dieicosyl amine, didocosylamine, methyloctylamine, methyldodecylamine, methyloctadecylamine, methylbenzylamine, allylbenzylamine, allyloctadecylamine, benzyloctadecylamine; and natural mixtures, such as dicocoamine, ditallowamine, bis(hydrogenated tallow) amine, disoyamine and the like. Also useful in the preparation of the modified polyurethane of this invention are the 3,3-dialkylamino-1-propylamine compounds, such as 3,3-dimethylamino-1-propyl-amine, 3,3-dioctyl-1-propylamine, 3,3-ditallow-1-propylamine and the like. Tertiary amines, however, are not useful as capping agents in the preparation of the modified polyurethane of this invention unless they contain another active hydrogen moiety, since tertiary amines do not contain an active hydrogen.

In those instances wherein the polymerization reaction results in a polymer chain terminating with an active hydrogen moiety, the capping agent is a mono functional compound reactive with active hydrogen moieties, and is preferably a monoisocyanate. This situation can be arranged by employing a total number of equivalents of active hydrogen moieties derived from the polyether polyol and modifying agent which is greater than the number of equivalents of isocyanate provided by the polyisocyanate. After this intermediate is formed, it may then be capped using a monoisocyanate in an amount such that the total number of equivalents of isocyanate derived from the polyisocyanate and monoisocyanate is equal to or greater than the total number of equivalents of active hydrogen.

Suitable examples of monoisocyanate capping agents useful in the preparation of the modified polyurethane of this invention are: $C_8$ to $C_{22}$ alkyl isocyanates, such as 1-isocyanatooctane, 1-isocyanatodecane, 1-isocyanatododecane, 1-isocyanatotetradecane, 1-isocyanatohexadecane, 1-isocyanatooctadecane, 1-isocyanatoeicosane, and 1-isocyanatodocosane; cycloaliphatic isocyanates, such as isocyanatocyclohexane and isocyanotocyclododecane; aromatic isocyanates, such as phenyl isocyanate; and monoisocyanates formed by the selective reaction of active hydrogen compounds with polyisocyanate compounds such that only one isocyanate function remains, such as those which are formed by the reaction of $C_8$ to $C_{22}$ alcohols with isophorone diisocyanate.

Preparation of the modified polyurethane of the present invention is achieved by reacting the polyisocyanate, the polyether polyol and the modifying agent to form the uncapped modified polyurethane and simultaneously or, preferably, subsequently reacting this polymer with the capping agent. The reaction is carried out under substantially anhydrous conditions and may be carried out either in the presence or absence of a solvent. If a solvent is used, it may constitute only a portion of the reaction mixture preferably from about 10 to about 70% and most preferably from about 10 to about 30% of the final reaction mixture.

The solvent, if used, must itself be substantially anhydrous, or made so prior to addition of any isocyanate compound to the reaction mixture. Suitable solvents useful in the preparation of the modified polyurethane of the present invention include: aromatic hydrocarbons, such as benzene, toluene, and xylenes; glycol ether solvents, such as glyme (glycol dimethyl ether) and diglyme; polar organic solvents, such as dimethyl formamide, methylsulfoxide, 1-methyl-2-pyrrolidinone, 1-butyl-2-pyrrolidinone, dimethylacetamide, gammabutyrolactone, gamma butyrolactam, dioxane and acetonitrile.

The solvent, if used, must also be unreactive under the reaction conditions employed with the polyether polyol, the modifying agent or the polyisocyanate. The solvent may be water soluble or water insoluble. If a water soluble solvent is used as the reaction solvent, the modified polyurethane of this invention may be used without isolation prior to use (i.e., as prepared), if the water soluble solvent is compatible with the system in which the modified polyurethane is employed. On the other hand, if a water insoluble solvent is used in the preparation of the modified polyurethane of this invention, the solvent is preferably removed or the modified polyurethane is otherwise isolated prior to use.

The preferred solvent for the preparation of the modified polyurethane of this invention is toluene because (1) of its ability to azeotropically remove water from the reactants and the reaction mixture and (2) because the boiling point allows easy isolation of the modified polyurethane after the completion of the reaction. Most preferred, however, is to carry out the reaction in the absence of a solvent.

The reaction may be carried out in any vessel known to those of ordinary skill in the art as capable of handling the preparation of polyurethane. For example, the vessel may be enclosed with an outlet for gas, may have temperature control and agitation means and may be constructed of glass, stainless steel, or carbon steel. Into the vessel is charged the solvent, if any, and the polyether polyol. To ensure that the reaction proceeds in a substantially anhydrous environment, the polyether polyol and the solvent may be subjected to a drying step, such as by azeotropic drying, and the reaction may occur under an inert gas atmosphere, such as a nitrogen atmosphere.

The material is cooled to a temperature in the range of from about 20° to about 150° C. To facilitate the reaction, from about 0.005 to about 1.000% by weight of the total reactants of a conventional urethane catalyst is added. Such catalysts are exemplified by catalytically active compounds of bismuth, lead, tin, titanium, iron, antimony, uranium, cadmium, cobalt, thorium, aluminum, mercury, zinc, nickel, vanadium, cerium, as well as magnesium oxide, barium oxide, triethylene diamine, tertiary amines, pyrones, lactams and acids, with the preferred catalyst being dibutyltin dilaurate.

To the reaction vessel is then added the polyisocyanate and the modifying agent and the reaction is permitted to proceed at a temperature in the range of from about 20° to about 150° C. for from about 0.1 to about 48 hours. The reaction conditions are selected such that there are substantially no side reactions between two molecules of the modifying agent or between the modifying agent and the polyether polyol. Thus, for example, while the modifying agent may contain two carboxylic acid groups or a carboxylic acid group and a hydroxyl group, the reaction conditions (e.g., temperature) are selected such that the preparation of a polyester is substantially avoided.

In the event that gaseous by-products are produced, such as carbon dioxide during the formation of amide linkages, they may be removed from the reaction vessel. Upon completion of the polymerization step, the capping agent is added to the vessel and the mixture is maintained at a temperature of from about 20° to about 150° C. for from about 1 to about 48 hours to permit capping to occur. If a water insoluble solvent has been used, it is removed, such as by evaporation, the modified polyurethane is cooled to a temperature at or below its glass transition temperature in order to facilitate grinding e.g., to a temperature of from about 25° to about −100° C., preferably from about 0° to about −100° C., such as by mixing it with dry ice or liquid nitrogen, to solidify it and the solidified polymer is ground to a particle size suitable for incorporation into an aqueous composition.

The modified polyurethane of the present invention is resistant to microbial attack and is a superior thickening agent for aqueous compositions. Typical aqueous compositions which may include the modified polyurethane of the present invention are paints, coatings, synthetic plaster, cosmetics, personal care items, adhesives, sealants, inks, drilling fluids, packer fluids and any other aqueous compositions requiring thickening.

The modified polyurethane may be incorporated into aqueous compositions in amounts ranging from about 0.005 to about 10, preferably from about 0.01 to about 3.00 and most preferably from about 0.05 to about 1.00% by weight. The modified polyurethane is mixed into the aqueous composition using conventional mixing equipment such as high speed dispersers, ball mills, sand mills, pebble mills, paddle mixers, and other such mixing equipment. The modified polyurethane may be in the form of a dry powder, a premixed aqueous gel or a slurry or solution in a water compatible solvent. In this later regard, a solvent may be selected to prepare the modified polyurethane so that it may be directly mixed into the aqueous composition. Of course, the composition may normally contain other known ingredients, such as pigments, surfactants, defoamers, preservatives, etc. in known combinations and amounts depending on the particular end use.

One important characteristic of the modified polyurethane of the present invention is the fact that it is water dispersible. That is, the polymer readily disperses in most aqueous systems to form a colloidal dispersion therein. In particular, the polyurethane thickener of this invention is infinitely compatible, once dispersed, with water over a wide range of temperatures without later separation on standing.

The modified polyurethane also exhibits a high level of efficiency as a thickening agent. As used in the context of the present invention, efficiency is determined by the increase in viscosity caused by the addition of a certain amount of the modified polyurethane to an aqueous composition. The modified polyurethane of the present invention exhibits a viscosity in the range of from about 12,000 to about 40,000 cP, preferably from about 20,000 to about 30,000 cP when measured as a 4% by weight aqueous dispersion using a Brookfield LVT Rotational Viscometer (#4 Spindle, 12 RPM) at 25° C. The aqueous dispersions are prepared by dispersing the powdered polyurethane thickener in water at 60° C. using a 1 HP Premier dispersator fitted with a 1⅝" diameter Cowles-type blade and operated at 3000 RPM. Stirring is continued for a maximum of 10 minutes, or until a smooth, homogeneous gel is formed. By comparison, unmodified polyurethane thickeners under similar conditions exhibit viscosities of 8000 to 15,000 cP.

Additionally, the modified polyurethane of the present invention imparts superior leveling characteristics to aqueous compositions. This enables water-based paint formulations to be prepared which do not unduly sag or flow when applied to a vertical surface.

One possible explanation of the superior nature of the modified polyurethane of the present invention is the presence of the different types of linkages in the polymer chain caused by the modifying agent. Urethane linkages do not hydrogen bond particularly well because the adjacent oxygen tends to donate electrons which acts to neutralize the positive center on the carbonyl carbon atom and thereby reduces the polar nature of the group. This does not occur with linkages caused by the presence of the modifying agent, such as amide and urea linkages, and hydrogen bonding is therefore promoted. Of course, this possible explanation should in no way be interpretted as limiting the present invention which is exemplified and compared in the following examples.

COMPARATIVE EXAMPLE 1

To a 500 ml, 3-necked glass flask equipped with a nitrogen sweep, thermometer, stirrer, Dean-Stark-trap, condenser and heating mantle is added 250 ml of toluene and 88.35 grams (0.01 mole) of polyethylene glycol obtained from Union Carbide which has a hydroxyl value of 12.7 and an average molecular weight of 8835 (0.02 OH equivalents). The mixture is azeotroped dry using a nitrogen sweep at about 110° C., the Dean-Stark trap is replaced by a septum arrangement and the mixture is cooled to 75° C.

To the flask is added 0.06 grams of dibutyltin dilaurate using a pipette and 1.4 grams of an 80/20 molar mixture of 2,4-and 2,6-tolylene diisocyanate (0.008 mole, 0.016 NCO equivalents) using a syringe. The reaction mixture is held for 2 hours at 75° C. and then 2.4 grams of 1-isocyanatooctadecane (0.008 moles, 0.008 NCO equivalents) is added and the resulting mixture is cooled to 60° C. for about 20 hours whereby a cloudy viscous solution results.

The solution is rotoevaporated at 90° C. under vacuum and is poured into a crystallization dish wherein it cools to produce a paraffin-like material. The material is placed in a blender with dry ice and is chopped into a fine powder having a maximum particle size of about 400 microns.

The aqueous dispersions are prepared by heating 192 grams of water to 60° C. in a stainless steel beaker and adding thereto 8 grams of the powdered thickener under agitation with a Premier Dispersator fitted with a 1⅜" diameter Cowles-type blade. The speed of the stirrer is increased to 3000 rpm and held at that speed for a maximum of 10 minutes, or until a smooth, homogeneous gel is produced. After cooling to 25° C., the composition exhibits a viscosity of 14,500 cP using a Brookfield LVT Rotational Viscometer (#4 Spindle) at 12 rpm.

EXAMPLE 1

The reaction vessel of Comparative Example 1 is again employed. To the vessel is charged 79.52 grams (0.009 moles, 0.018 OH equivalents) of the same polyethylene glycol used in Comparative Example 1 with 230 ml of toluene.

The mixture is azeotroped dry using a nitrogen sweep at about 100° C., the Dean-Stark trap is replaced by a septum arrangement and the mixture is cooled to 75° C.

To the flask is added 0.06 grams of dibutyltin dilaurate, 0.06 grams of ethylene diamine (0.001 mole, 0.002 NH$_2$ equivalents) and 1.4 grams of a 80/20 molar mixture of 2,4- and 2,6-tolylene diisocyanate (0.008 moles, 0.016 NCO equivalents). The mixture is held for 2 hours at 75° C., 2.4 grams of 1-isocyanato-octadecane (0.008 moles, 0.008 NCO equivalents) is then added and the reaction mixture is held at 60° C. for about 19 hours.

The modified polyurethane is then recovered in the same manner as in Comparative Example 1 to yield a non-hygroscopic, fine white powder having an average particle size of about 400 microns. The powder is formed into a 4% by weight opaque aqueous solution which exhibits a smooth, slippery feeling. Using the same viscosity measurement conditions as in Comparative Example 1, a viscosity of 24,000 cP is measured. Thus, in this example, by substituting 10 mole % of the polyethylene glycol with ethylene diamine, a 66% increase in viscosity is obtained.

EXAMPLE 2

The procedure of Example 1 is repeated except that the ethylene diamine is replaced by 0.118 grams (0.001 moles) of succinic acid.

The viscosity of a 4% by weight aqueous solution at the same conditions as Comparative Example 1 is 21,400 cp, which is a 48% increase in viscosity over the solution described in Comparative Example 1.

EXAMPLE 3

A modified polyurethane is prepared according to the following formulation and process which is conducted in the absence of a solvent.

Reactor: Two quart sigma blade mixer, jacketed, manufactured by Paul O. Abbe, Inc.

Charge:

| Charge: Ingredient | MW | MOLES | MOLE RATIO | WEIGHT (grams) |
|---|---|---|---|---|
| PEG 8000* | 8000 | 0.31 | 9 | 2500 (2487 g PEG 13 g H$_2$O) |
| 80/20 2,4/2,6 TDI** | 174 | 0.2736 | 8 | 47.6 |
| Dibutyl Tin Dilaurate*** | 631.55 | — | — | 2.05 |
| Ethylene Diamine | 60.1 | 0.034 | 1 | 2.05 |
| Octadecyl Isocyanate**** | 295 | 0.31 | 9 | 91.10 |

*Flaked polyethylene glycol (7000-9000 mw) referred to as PEG and available under the name Carbowax 8000 from Union Carbide Company
**80/20 molar mixture of 2,4 and 2,6 tolylene diisocyanate available under the name TD-80 from Mobay Chemical Company
***Available under the name Cotin 200 from Cosan Chemical Company
****Available under the name Mondur O from Mobay Chemical Company

PROCEDURE

1. The PEG is charged to the sigma blade reactor and melting is started by adding steam to the reactor jacket.
2. After 2 hours, 10 minutes the PEG is observed to be melted and the agitation is started (44 and 34 rpm on the two sigma blades.
3. The reactor is linked up to the vacuum system through a condensate trap.
4. A vacuum of 21.5" to 22" Hg is pulled on the PEG for about 2 hours, 5 minutes, maintaining the temperature at 95°–100° C. during the period to dewater the PEG. Water is reduced to 0.11% from an initial value of 0.5%.
5. After the dewatering step, the pressure in one reactor is zeroed (to atmospheric) with nitrogen and a slow nitrogen purge is placed on the reactor.

6. The PEG is cooled to 75° C. in about 10 minutes by running cold water through the reactor jacket.
7. The TDI is added and allowed to mix with the molten PEG for 10 minutes.
8. The dibutyl tin dilaurate and ethylene diamine were added in that order.
9. The reaction is allowed to proceed for about 30 minutes during which time a large increase in viscosity is observed.
10. At the end of this period, 25% of the octadecyl isocyanate is added.
11. The mixture is reacted for about 1 hour at 75°–80° C.
12. Another 25% of the octadecyl isocyanate is added.
13. The mixture is reacted for about 1 hour at 80°–84° C.
14. The remaining 50% of the octadecyl isocyanate is added.
15. The temperature is increased to 90° C. and the reaction is allowed to continue for about 3½ additional hours.
16. The material is discharged and allowed to cool.

Samples of the material prepared in accordance with Comparative Example 1, Examples 1, 2 and 3 and a control of Cellulosic QP 4400 which is hydroxyethyl cellulose commercially available from Union Carbide are incorporated into a high gloss acrylic screening composition prepared according to the formulation set forth in Table I.

TABLE I

| Component | Description | Pounds | Gallons |
|---|---|---|---|
| Tamol 731* | Anionic, polymer-type of dispersant available from Rohm & Haas Co. | 10.8 | 1.31 |
| Nopco NDW* | Liquid defoamer available from the Nopco Division of Diamond Shamrock Chemical Co. | 2.0 | 0.27 |
| Propylene glycol | | 85.0 | 9.86 |
| Titanox 2020* | Titanium dioxide pigment available from NL Industries, Inc. | 269.6 | 7.86 |
| Propylene glycol | | 32.6 | 3.78 |
| Rhoplex AC-490* | Aqueous, opaque dispersion of acrylic copolymers available from Rohm & Haas Co. | 555.9 | 62.71 |
| Super AD IT* | Mercurial preservative and fungicide available from Tenneco Chemicals, Inc. | 1.0 | 0.12 |
| Water | | 15.2 | 1.8 |
| Texanol* | 2,2,4-Trimethyl-1,3-pentanediol isobutyrate coalescent available from Eastman Chemical Products, Inc. | 15.7 | 1.98 |
| Triton GR-7M* | Anionic surfactant available from Rohm & Haas Co. | 2.0 | 0.23 |
| Nopco NDW* | Liquid defoamer available from the Nopco Division of Diamond Shamrock Chemical Co. | 2.9 | 0.40 |
| Aqueous dispersion of Thickener | | 80.6 | 9.66 |
| | | 1064.3 | 100.00 |

*Indicates trademarked item.

The screening composition is prepared as follows:

A high speed dispersator with RPM indicator is used with a powerstat to control rotational speed. A 2½″ saw toothed, cowles type blade is used with a 4 liter stainless steel beaker. The blade is positioned about 1″ to 2″ from the bottom of the beaker during the grind.

The grind materials, which include Tamol 731, NDW propylene glycol and Titanox 2020 are added to the beaker while stirring to ensure a homogeneous mix. Stirring is increased to 5400 rpm and the grind is continued for 15 minutes.

Stirring is slowed to under 2000 rpm and the propylene glycol, Rhoplex AC-490, Super AD IT, water, Texanol, Triton GR-7M and NDW are added sequentially. Stirring is continued until the masterbatch is thoroughly mixed.

To one pint cans, 563 grams of the masterbatch is added. The same mixing equipment is used to stir in the aqueous dispersion of the thickener. Stirring is continued, at a rate so as not to allow air to be pulled into the mix for five minutes. The paint is poured into two one half pint lined cans for testing. The loading of thickener in each case is 2.0 pounds per 100 gallons and the results are set forth in Table II.

TABLE II

| Sample | Stormer Viscosity (1 Day. KU[1]) | Gloss 60°[2] |
|---|---|---|
| Cellulosic QP 4400 | 88 | 81.1 |
| Comparative Example 1 | 97 | 83.3 |
| Example 1 | 114 | 84.4 |
| Example 2 | 101 | 85.3 |
| Example 3 | 98 | 81.0 |

[1]Stormer Viscosity is determined under low shear conditions according to ASTM D562-55 using a 9730-F10 Series Stormer Viscometer and is in terms of Krebs Units.
[2]Gloss 60° is determined by a Gardner Instruments Glossgard[R] System 60 Glossmeter using ASTM 523-67

The invention being thus described, it will be obvious that the same may be varied in many ways. Such variations are not to be regarded as a departure from the spirit and scope of the invention and all such modifications are intended to be included within the scope of the following claims.

What is claimed is:

1. A water dispersible modified polyurethane which is the product of a reaction conducted under substantially anhydrous conditions of:
   (a) polyisocyanate;
   (b) polyether polyol in an amount ranging from about 0.10 to about 10.00 moles per mole of polyisocyanate;
   (c) modifying agent in an amount ranging from about 0.015 to about 3.400 moles per mole of polyisocyanate, said modifying agent having the formula $$X_x-R-Y_y$$

wherein R represents a group containing from 0 to 10 carbon atoms, X is a group containing at least one active hydrogen moiety selected from the group consisting of primary amino, secondary amino, carboxyl and mixtures thereof, Y is a group containing at least one active hydrogen moiety selected from the group consisting of primary amino, secondary amino, carboxyl, hydroxyl, mercapto and mixtures thereof, the sum of $(x+y)$ is an integer greater than 1 and x is at least 1 wherein the modifying agent is composed of less than about 20 mole % of compounds wherein the sum of $(x+y)$ is at least 3 and wherein the polyisocyanate, the polyether polyol and the modifying agent are used to form the polymer chain; and
   (d) capping agent which is reactive with the reaction product of the polyisocyanate, the polyether polyol and the modifying agent and which is present in an amount sufficient to cap the reaction product of the polyisocyanate, polyether polyol and the modifying agent.

2. The water dispersible, modified polyurethane of claim 1 wherein the polyisocyanate is composed of less than about 20 mole % of tri and higher functional polyisocyanates.

3. The water dispersible, modified polyurethane of claim 1 wherein the polyisocyanate is selected from the group consisting of 1,6-hexamethylene diisocyanate, 1-isocyanato-3-isocyanato-methyl-3,5,5-trimethyl cyclohexane, 2,4-tolylene diisocyanate, 2,6-tolylene diisocyanate and mixtures thereof.

4. The water dispersible, modified polyurethane of claim 1 wherein the polyether polyol is present in an amount ranging from about 0.50 to about 5.00 moles per mole of polyisocyanate.

5. The water dispersible, modified polyurethane of claim 1 wherein the average molecular weight of the polyether polyol is from about 4,000 to about 20,000.

6. The water dispersible, modified polyurethane of claim 1 wherein the polyether polyol is a homopolymer or a block or random copolymer having the repeating unit:

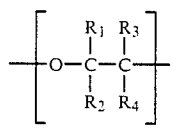

wherein $R_1$, $R_2$, $R_3$ and $R_4$ are independently selected from the group consisting of H, $CH_3$ and $C_2H_5$.

7. The water dispersible, modified polyurethane of claim 1 wherein the polyether polyol is composed of less than about 50% equivalent % of three-dimensional polymer forming material.

8. The water dispersible, modified polyurethane of claim 1 wherein the modifying agent is present in an amount ranging from about 0.025 to about 1.000 moles per mole of polyisocyanate.

9. The water dispersible, modified polyurethane of claim 1 wherein the modifying agent is composed of less than about 10 mole % of compounds wherein the sum of (x+y) is at least 3.

10. The water dispersible, modified polyurethane of claim 1 wherein the modifying agent is selected from the group consisting α, ω-diaminoalkanes, dicarboxylic acids, aminocarboxylic acids and mixtures thereof.

11. The water dispersible, modified polyurethane of claim 1 wherein the capping agent is present in an amount ranging from about 0.10 to about 10.00 moles per mole of polyisocyanate.

12. The water dispersible, modified polyurethane of claim 1 wherein the capping agent is a monoisocyanate.

13. A water dispersible, modified polyurethane which is the product of a reaction conducted under substantially anhydrous conditions of:
(a) polyisocyanate selected from the group consisting of 1,6-hexamethylene diisocyanate, 1-isocyanato-3-isocyanatomethyl-3,5,5-trimethylcyclohexane, 2,6-tolylene diisocyanate, 2,4-tolylene diisocyanate and mixtures thereof;
(b) polyether polyol in an amount ranging from about 0.10 to about 10.00 moles per mole of polyisocyanate, said polyether polyol having an average molecular weight in the range of from about 4,000 to about 20,000 and having the repeating unit

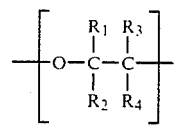

wherein $R_1$, $R_2$, $R_3$ and $R_4$ are independently selected from the group consisting of H, $CH_3$ and $C_2H_5$;
(c) modifying agent in an amount ranging from about 0.015 to about 3,400 moles per mole of polyisocyanate, said modifying agent being selected from the group consisting of α, ω-diaminoalkanes, dicarboxylic acids, aminocarboxylic acids, and mixtures thereof; and
(d) capping agent which is reactive with the reaction product of the polyisocyanate, the polyether polyol and the modifying agent and which is present in an amount sufficient to cap the reaction product of the polyisocyanate, the polyether polyol and the modifying agent.

14. The water dispersible modified polyurethane of claim 13 wherein the polyisocyanate is a mixture of 2,4-tolylene diisocyanate and 2,6-tolylene diisocyanate.

15. The water dispersible modified polyurethane of claim 13 wherein the polyether polyol is present in an amount ranging from about 0.50 to about 5.00 moles per mole of the polyisocyanate and has an average molecular weight in the range of from about 4,000 to about 14,000.

16. The water dispersible modified polyurethane of claim 15 wherein the polyether polyol is polyethylene glycol.

17. The water dispersible modified polyurethane of claim 13 wherein the modifying agent is ethylenediamine, succinic acid or mixtures thereof.

18. The water dispersible modified polyurethane of claim 13 wherein the capping agent is a monoisocyanate.

19. The water dispersible modified polyurethane of claim 18 wherein the capping agent is 1-isocyanatooctadecane.

20. A thickened aqueous composition comprising:
(a) water; and
(b) from about 0.005 to about 10.00% by weight of a water dispersible, modified polyurethane which is the product of a reaction conducted under substantially anhydrous conditions of:
(i) polyisocyanate;
(ii) polyether polyol in an amount ranging from about 0.10 to about 10.00 moles per mole of polyisocyanate;
(iii) modifying agent in an amount ranging from about 0.015 to about 3.400 moles per mole of polyisocyanate, said modifying agent having the formula

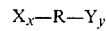

$$X_x - R - Y_y$$

wherein R represents a group containing from 0 to 10 carbon atoms, X is a group containing at least one active hydrogen moiety selected from the group consisting of primary amino, secondary amino, carboxyl and mixtures thereof, Y is a group containing at least one active hydrogen moiety selected from the group consisting of primary amino, secondary amino, carboxyl, hydroxyl, mercapto and mixtures thereof, the sum of (x+y) is an integer greater than 1 and x is at least 1 wherein the modifying agent is composed of less than about 20 mole % of compounds wherein the sum of (x+y) is at least 3 and wherein the polyisocyanate, the polyether polyol and the modifying agent are used to form the polymer chain; and (iv) capping agent which is reactive with the reaction product of the polyisocyanate, the polyether polyol and the modifying agent and which is present in an amount sufficient to cap the reaction product of the polyisocyanate, the polyether polyol and the modifying agent.

21. A method of increasing the viscosity and improving the leveling characteristics of an aqueous composition comprising mixing the aqueous composition with from 0.005 to about 10.000% by weight of a water dispersible, modified polyurethane which is the product of a reaction conducted under substantially anhydrous conditions of (a) polyisocyanate;
(b) polyether polyol is an amount ranging from about 0.10 to about 10.00 moles per mole of polyisocyanate;
(c) modifying agent in an amount ranging from about 0.015 to about 3.400 moles per mole of polyisocyanate, said modifying agent having the formula $$X_x\text{—}R\text{—}Y_y$$

wherein R represents a group containing from 0 to 10 carbon atoms, X is a group containing at least one active hydrogen moiety selected from the group consisting of primary amino, secondary amino, carboxyl and mixtures thereof, Y is a group containing at least one active hydrogen moiety selected from the group consisting of primary amino, secondary amino, carboxyl, hydroxyl, mercapto and mixtures thereof, the sum of (x+y) is an integer greater than 1 and x is at least 1 wherein the modifying agent is composed of less than about 20 mole% of compounds wherein the sum of (x+y) is at least 3 and wherein the polyisocyanate, the polyester polyol and the modifying agent are used to form the polymer chain; and (d) capping agent which is reactive with the reaction product of the polyisocyanate, the polyether polyol and the modifying agent and which is present in an amount sufficient to cap the reaction product of the polyisocyanate, the polyether polyol and the modifying agent.

22. The method of claim 21 wherein the water dispersible, modified polyurethane in the form of a dry powder is mixed with the aqueous composition.

23. The method of claim 21 wherein the water dispersible, modified polyurethane in the form of a slurry or solution in a water compatible solvent is mixed with the aqueous composition.

24. The method of claim 23 wherein the slurry or solution is the reaction mixture for preparing the water dispersible, modified polyurethane.

25. The method of claim 21 wherein the water dispersible, modified polyurethane in the form of a premixed aqueous gel is mixed with the aqueous composition.

26. A method of preparing a water dispersible modified polyurethane comprising:

(a) reacting at a temperature in the range of from about 20 to about 150° C. for from about 0.1 to about 48 hours under substantially anhydrous conditions (i) polyisocyanate,
(ii) polyether polyol in an amount ranging from about 0.10 to about 10.00 moles per mole of polyisocyanate, and
(iii) modifying agent in an amount ranging from about 0.015 to about 3.400 moles per mole of polyisocyanate, said modifying agent having the formula $$X_x\text{—}R\text{—}Y_y$$

wherein R represents a group containing from 0 to 10 carbon atoms, X is a group containing at least one active hydrogen moiety selected from the group consisting of primary amino, secondary amino, carboxyl and mixtures thereof, Y is a group containing at least one active hydrogen moiety selected from the group consisting of primary amino, secondary amino, carboxyl, hydroxyl, mercapto and mixtures thereof, the sum of (x+y) is an integer greater than 1 and x is at least 1 wherein the modifying agent is composed of less than about 20 mole % of compounds wherein the sum of (x+y) is at least 3 and wherein the polyisocyanate, the polyether polyol and the modifying agent are used to form the polymer chain;

(b) reacting with the reaction product of step a), at a temperature in the range of from about 20° to about 150° C. for from about 1 to about 48 hours and under substantially anhydrous conditions, capping agent in an amount sufficient to cap the reaction product of step (a) to thereby form the water dispersible modified polyurethane; and (c) recovering the water dispersible, modified polyurethane.

27. The method of claim 26 wherein the polyether polyol is dried prior to the reaction.

28. The method of claim 26 wherein the polyether polyol is placed in a reaction vessel and the polyisocyanate and the modifying agent are added thereto.

29. The method of claim 26 wherein the reactions of steps (a) and (b) occur in the presence of a substantially anhydrous solvent.

30. The method of claim 29 wherein the water dispersible, modified polyurethane is recovered by evaporating any remaining solvent, cooling to at or below the glass transition temperature of the modified polyurethane and comminuting the modified polyurethane to obtain a fine powder.

* * * * *

UNITED STATES PATENT AND TRADEMARK OFFICE
CERTIFICATE OF CORRECTION

PATENT NO.   :  4,499,233
DATED        :  Feb. 12, 1985
INVENTOR(S)  :  Tetenbaum et al It is certified that error appears in the above-identified patent and that said Letters Patent is hereby corrected as shown below:

On the cover page, line 2, after "Date of Patent:", amend "Feb. 12, 1985" to -- * Feb. 12, 1985 --.

On the cover page, after the line identifying the Assignee, insert

-- [*] Notice: The portion of the term of this patent subsequent to March 13, 2001, has been disclaimed. --.

Signed and Sealed this

Tenth Day of September 1985

[SEAL]

Attest:

DONALD J. QUIGG

Attesting Officer    Acting Commissioner of Patents and Trademarks - Designate